United States Patent
Konik et al.

(10) Patent No.: US 9,471,632 B2
(45) Date of Patent: Oct. 18, 2016

(54) QUERY OPTIMIZATION CONSIDERING VIRTUAL MACHINE MIRRORING COSTS

(71) Applicant: International Business Machines Corporation, Armonk, NY (US)

(72) Inventors: Rafal P. Konik, Oronoco, MN (US); Roger A. Mittelstadt, Byron, MN (US); Brian R. Muras, Rochester, MN (US); Mark W. Theuer, Rochester, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 392 days.

(21) Appl. No.: 14/057,118

(22) Filed: Oct. 18, 2013

(65) Prior Publication Data
US 2015/0112964 A1    Apr. 23, 2015

(51) Int. Cl.
   *G06F 17/30*     (2006.01)
   *H04L 29/08*    (2006.01)

(52) U.S. Cl.
   CPC ... *G06F 17/30463* (2013.01); *G06F 17/30442* (2013.01); *H04L 67/10* (2013.01)

(58) Field of Classification Search
   CPC .................. G06F 17/30463; G06F 17/30442; H04L 67/10
   USPC ....................................................... 707/718
   See application file for complete search history.

(56) References Cited

U.S. PATENT DOCUMENTS

| | | | |
|---|---|---|---|
| 6,170,044 B1 * | 1/2001 | McLaughlin | G05B 9/03 711/112 |
| 6,339,769 B1 * | 1/2002 | Cochrane | G06F 17/30457 707/999.002 |
| 6,671,786 B2 | 12/2003 | Wang et al. | |
| 7,774,645 B1 | 8/2010 | Clark et al. | |
| 2004/0220942 A1 * | 11/2004 | Agrawal | G06F 17/30595 707/999.1 |
| 2005/0223271 A1 * | 10/2005 | Butterworth | G06F 11/2082 714/6.3 |
| 2006/0117300 A1 * | 6/2006 | Puthukattukaran | G06F 11/1658 717/124 |
| 2007/0174292 A1 * | 7/2007 | Li | G06F 17/30457 707/999.01 |
| 2008/0040334 A1 * | 2/2008 | Haber | G06F 17/30448 707/999.004 |
| 2008/0228835 A1 * | 9/2008 | Lashley | G06F 11/2041 707/999.202 |
| 2010/0318495 A1 * | 12/2010 | Yan | G06F 17/30575 707/618 |

(Continued)

FOREIGN PATENT DOCUMENTS

| | | |
|---|---|---|
| EP | 1872249 A2 | 1/2008 |
| WO | 2012065974 A1 | 5/2012 |

OTHER PUBLICATIONS

J. Zhu, et al., "Optimizing the Performance of Virtual Machine Synchronization for Fault Tolerance", IEEE Transactons on Computers, vol. 60, No. 12, Dec. 2011, pp. 1718-1729.

*Primary Examiner* — Rehana Perveen
*Assistant Examiner* — Tiffany Thuy Bui
(74) *Attorney, Agent, or Firm* — Patterson + Sheridan, LLP

(57) ABSTRACT

Techniques are disclosed for selecting between query execution plans in part based on virtual machine (VM) mirroring costs. In one embodiment, a query optimizer determines runtimes for multiple query execution plans, and modifies these runtimes based on flashing cost, which is itself determined based on the amount of memory which needs to be flashed to the secondary memory if each execution plan is executed. In so doing, the query optimizer may select a execution plan which takes a longer to run, but incurs less flashing cost. By considering both the query runtime itself and the flashing cost, the query optimizer may be better able to determine the fastest query execution plan to execute.

8 Claims, 4 Drawing Sheets

(56) References Cited

U.S. PATENT DOCUMENTS

| | | | |
|---|---|---|---|
| 2012/0084520 A1* | 4/2012 | Chou | G06F 11/1484 711/162 |
| 2012/0191908 A1 | 7/2012 | North et al. | |
| 2012/0226668 A1* | 9/2012 | Dhamankar | G06F 17/30303 707/690 |
| 2013/0073823 A1 | 3/2013 | Hunter et al. | |
| 2013/0117497 A1* | 5/2013 | Cui | G06F 12/121 711/103 |
| 2014/0115164 A1* | 4/2014 | Kalyanaraman | H04L 29/08954 709/226 |
| 2015/0058295 A1* | 2/2015 | Veeraraghavan | G06F 11/1451 707/649 |
| 2015/0169239 A1* | 6/2015 | Sakai | G06F 9/455 711/162 |

* cited by examiner

QUERY OPTIMIZATION CONSIDERING VIRTUAL MACHINE MIRRORING COSTS

BACKGROUND

1. Field of the Invention

The present invention generally relates to query optimization, and, more specifically, to query optimization that accounts for virtual machine mirroring costs as part of the optimization process.

2. Description of Related Art

In a virtual machine (VM) mirroring environment, a primary VM is periodically halted and mirrored to a secondary (backup) VM. Doing so allows a client to quickly and seamlessly connect to the secondary VM if the primary VM crashes. Various VM mirroring implementations are publicly available, such as IBM® PowerHA® SystemMirror.

During VM mirroring, execution of the primary VM is typically halted, after which all state information including registers, central processing unit (CPU) contents, and modified random access memory (RAM) pages (also referred to herein as "dirty" pages) are copied by the primary VM to the secondary VM. Copying of the state information from the primary VM to the secondary VM is generally referred to herein as "flashing." Once copied, the secondary VM acknowledges receipt of the pages of state info, and the primary VM resumes execution. In some implementations, mirroring may be performed many times a second. Techniques exist for predicting when a VM will be halted and its state information flashed to the secondary VM.

When VMs run database queries, such as in IBM's DB2, pages of temporary information are frequently used as scratchpads to help in computing a final query result. For example, a query engine may create temporary indexes, temporary hash tables, temporary results, etc. as intermediate result steps in executing a query. Memory pages containing such temporary data are typically mirrored to the secondary VM. However, this adds substantial overhead to the mirroring process, especially when the temporary data is large in size. Further, the temporary data may not be required on the secondary VM, so long as the secondary VM is able to execute the query should a failover be required.

SUMMARY

One embodiment provides a method for optimizing query execution. The method generally includes determining an original runtime for each of multiple execution plans for a query. The method further includes, if execution of the query overlaps with one or more VM mirroring operations, modifying each of the original runtimes of the execution plans based on time required to perform the mirroring operations if the query were executed according to the execution plan, selecting one of the execution plans based on the modified runtimes, and executing the query according to the selected execution plan.

Further embodiments of the present invention include one or more computer-readable storage media storing instructions that, when executed by a client device and a server system, cause the system to perform one or more aspects of the disclosed method, and a system programmed to carry out one or more aspects of the disclosed method.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
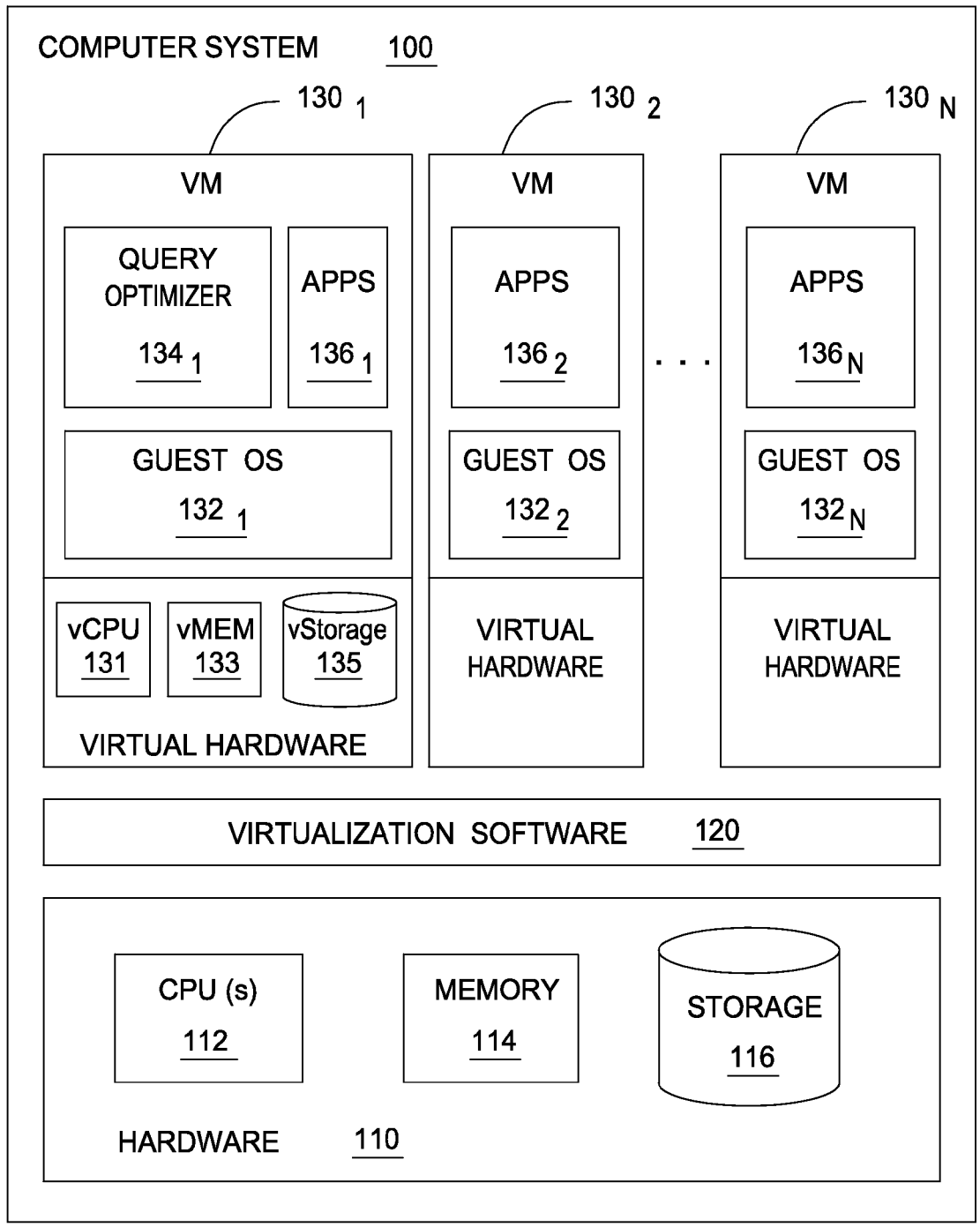
FIG. 1 depicts a block diagram of a system in which embodiments may be implemented.

Embodiments disclosed herein provide techniques for selecting between query execution plans, while accounting for VM mirroring costs. As used herein a query execution plan generally refers to a set of steps used to access data in a database. In one embodiment, a query optimizer may determine runtimes for multiple query execution plans and modify these runtimes based on the amount of memory which needs to be flashed to the secondary memory if each execution plan is executed. For example, an execution plan which includes generating a temporary hash table or other temporary result may run in a short amount of time, but require a large cost (in time) to flash the hash table. The query optimizer may therefore select another execution plan which takes longer to run, but incurs less flashing cost. By considering both the query runtime itself and the flashing cost, the query optimizer may better determine the best query execution plan to execute.

In another embodiment, queries determined to hit many memory pages and result in expensive flashing may be offloaded to a remote VM for execution such that only the call to the remote VM is flashed. The remote VM may then return query results to the original VM, and the results themselves may be flashed again to the secondary VM.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 depicts a block diagram of a computer system 100 in which an embodiment may be implemented. As shown, computer system 100 supports a virtual machine host 120, which may itself include virtualization software that permits hardware resources (e.g., CPU(s) 112, memory 114, storage 116, etc.) to be shared among virtual machines $130_{1-N}$ and provides an interface between guest software running on virtual machines $130_{1-N}$ and the underlying hardware. VM host 120 may run directly on hardware components of the computer system 100 or on top of an operating system of the computer system 100. In a particular embodiment, the VMs $130_{1-N}$ may be IBM DB2 virtual machines.

As shown, VM $130_1$ includes virtual hardware, namely a virtual CPU (vCPU) 131, virtual memory (vMEM) 133, and virtual storage (vStorage) 135. In one embodiment, the virtual storage 135 may store a database, and the VM $130_1$ further includes a query optimizer $134_1$ which generates and selects query plans for executing queries against the database. That is, the query optimizer $134_1$ may determine possible strategies and methods for executing a given query to generate query plans, and select a best query plan. Any feasible technique may be used to generate and select between query plans, including well-known techniques. A query engine (not shown) may then execute the query according to the query plan selected by the query optimizer $134_1$.

In one embodiment, the query optimizer $134_1$ may select a query plan based on estimated memory usage of the query plans, including the cost of flashing the memory used to a secondary (backup) VM during a VM mirroring operation. The cost of flashing temporary data generated while executing the query may make one query execution plan less costly than another, even where it may otherwise cost less to execute the other execution plan if flashing is not considered. As discussed in greater detail below, the query optimizer $134_1$ may, in one embodiment, determine runtimes for multiple query execution plans. The query optimizer $134_1$ may further determine if the query will coincide with a flashing operation. If such is the case, the query optimizer $134_1$ may modify the runtimes for the various query execution plans to account for the cost of flashing, and select a fastest modified execution plan.

In another embodiment, the query optimizer $134_1$ may determine that a particular execution plan will affect many (e.g., greater than a threshold number of) memory pages, and require those memory pages to be flashed at a great cost. In such a case, the query optimizer $134_1$ may route the query to a remote VM so that the query is executed on that remote VM, with results being returned to the VM $130_1$. Doing so may avoid costly flashing of temporary data, as what is flashed is instead the call to the remote machine and the returned results. In one embodiment, this approach may be one of several from which the query optimizer $134_1$ may choose. That is, the query optimizer $134_1$ may consider routing the query to a remote VM as one of the query plans, and select a best query plan among the available query plans.

Figure 2:
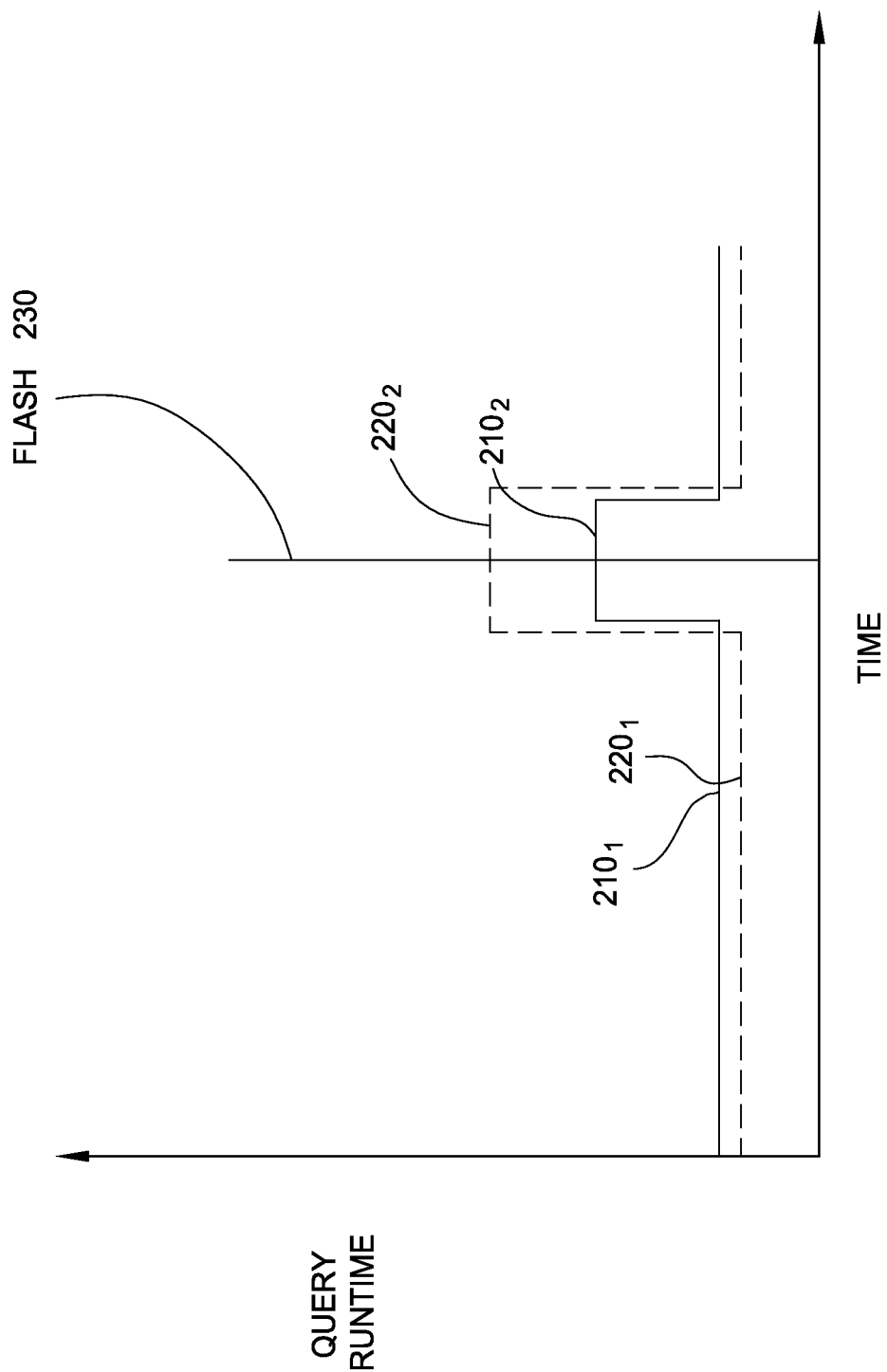
FIG. 2 illustrates runtimes for example query plans and flashing of a VM to a secondary VM over a time period, according to one embodiment.

FIG. 2 illustrates runtimes for example query plans and flashing of a VM to a secondary VM over a time period. As shown, query plan $210_1$ has greater runtime (i.e., takes longer to execute) than query plan $220_1$. Techniques are known for estimating query runtime, and any feasible technique for doing so may be employed. Illustratively, the runtimes of query plans $210_1$ and $220_1$ do not coincide with any of the flashes 230. In such a case, a query optimizer may select query plan $220_1$, to execute, as no cost to flash temporary data needs to be taken into account. That is, the query optimizer may simply select the faster query, query plan $220_1$, without accounting for flashing costs.

As shown, query plan $220_2$ has greater runtime than query plan $210_2$. The runtimes of query plans $210_2$ and $220_2$ coincide with one of the flashes 230. Illustratively, the query plan 220, which was less costly than query plan 210 when flashing did not occur, becomes more costly after accounting for the cost of flashing. Techniques are known for estimating when a flashing operation will occur. In one embodiment, the query optimizer may compare the flashing time to the time that the query will execute to determine if the runtimes of query plans $210_2$ and $220_2$ coincide with one of the flashes 230. Then, the query optimizer may account for the cost, in time or some other measurement, of flashing the memory during execution of the query plans $210_2$ and $220_2$. As a result, the query optimizer may select a different query plan to execute than if only the runtimes of the query plans themselves were compared. For example, the query plan $210_2$ may use an existing index and be known to be slower than the query plan $220_2$ which uses a temporary hash table. However, the query optimizer may keep track of, and therefore know that a large portion of the existing index is already resident in memory as a result of the execution of a previous query, whereas the temporary hash table is not resident in memory and needs to be created, requiring many memory pages to be modified. In such a case, flashing the existing index may require copying only minor changes made to the index, whereas flashing the temporary hash table may require copying the many modified memory pages, at a greater cost. As a result, the query optimizer may select the query plan $210_2$, which is slower if, e.g., the cost of flashing the temporary hash table plus the cost of running the query $220_2$ is greater than the cost of running the query plan $210_2$ plus the cost of flashing the existing index.

In another embodiment, the query optimizer may determine that a particular execution plan will affect many memory pages by, e.g., creating large memory objects, and require those memory pages to be flashed at a great cost. To avoid such flashing costs, the query optimizer may route the query to a remote VM so that the query is executed on that remote VM, with results being returned to the original VM. The query optimizer may consider this routing approach as one of the possible query plans in determining a best query plan.

Figure 3:
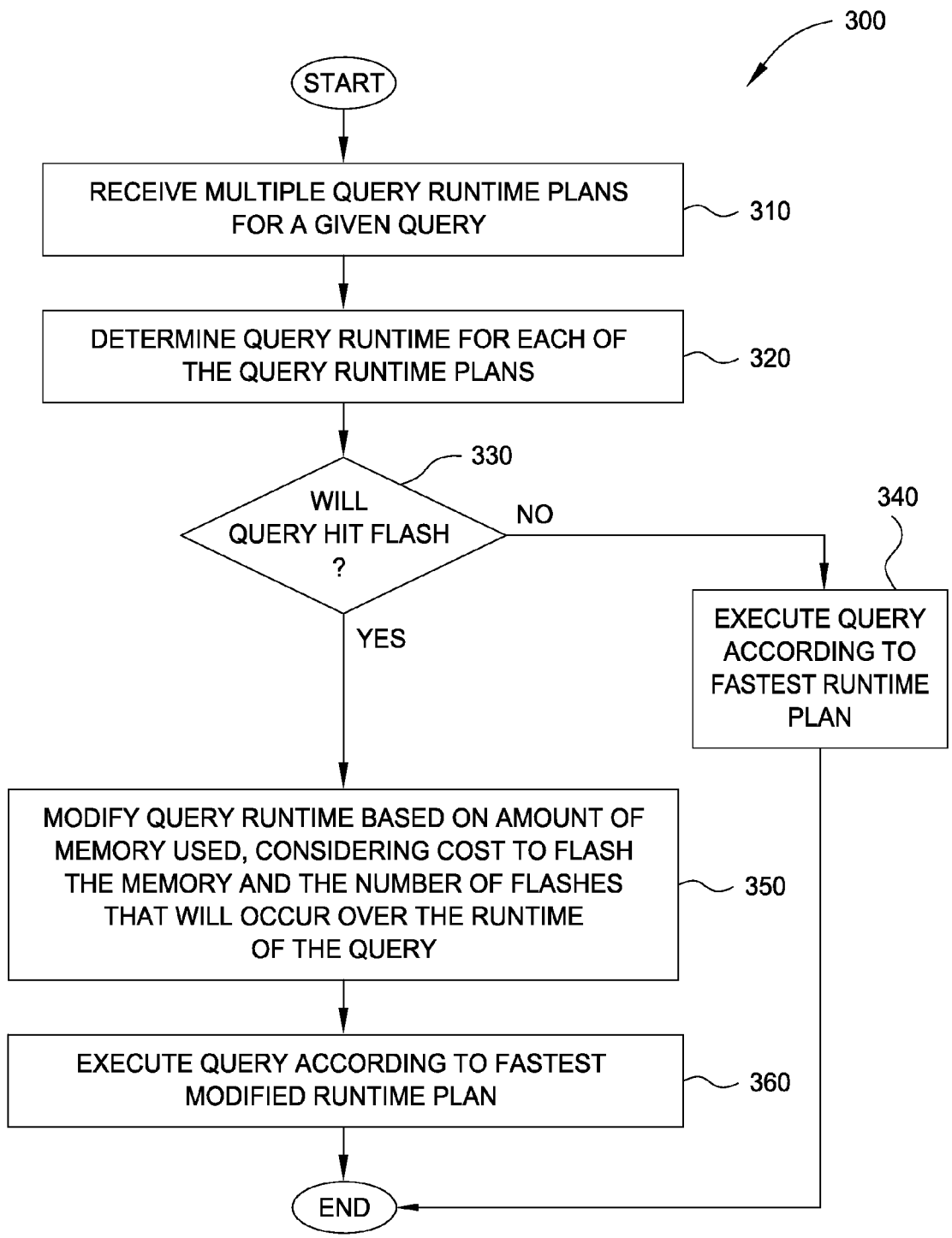
FIG. 3 illustrates a method for optimizing query execution that accounts for VM mirroring costs, according to one embodiment.

FIG. 3 illustrates a method 300 for optimizing query execution while accounting for VM mirroring costs, according to an embodiment. As shown, the method 300 begins at step 310, where a query optimizer receives multiple query execution plans for a given query. Note, although discussed herein as receiving query execution plans, the query optimizer itself may generate such execution plans in some embodiments. That is, the query optimizer itself may be responsible for determining possible sets of steps used to execute the query.

Different execution plans may use different memory resident objects. The objects may include hash tables, indexes, buffer pools, sort buffers, temporary tables, and materialized query tables (MQTs), among others. Some of these objects may already be in memory from, e.g., a previous query. Other objects may need to be newly created or loaded to memory. In one embodiment, the query optimizer may track which objects, and the percentage of those objects, are stored in memory over time.

At step 320, the query optimizer determines a query runtime for each of the query execution plans. The query runtime may be determined without regard to flashing cost. Well-known techniques exist for estimating query runtime, and any feasible technique may be used to determine the runtimes for the query execution plans.

At step 330, the query optimizer determines whether the query will hit a flash (i.e., whether execution of the query will coincide with a flashing operation). In one embodiment, the query optimizer may first detect the need to flash/backup the VM to a secondary VM. Techniques are known for predicting when flashing will occur. The query optimizer may compare predicted flash times with the times during which the query is expected to execute to determine whether the query will coincide with a flash. If the query optimizer determines that the query will not coincide with a flashing operation, then, at step 340, the query optimizer executes the query according to the fastest execution plan, as determined at step 320. In another embodiment, the query optimizer may actively attempt to schedule the query to execute when flashing does not occur.

If the query optimizer determines that the query will hit the flash then, at step 350, the query optimizer modifies the determined query runtime based on an amount of memory used, considering the cost to flash the memory and the number of flashes that will occur over the runtime of the query. As discussed, different query plans may require different amounts of memory usage, which in turn implies different costs to flash memory pages. For example, one query plan may use an existing index which is largely resident in memory as a result of the execution of a previous query, whereas another plan may generate a temporary hash table from scratch, requiring many memory pages to be modified. In such a case, the query plan which uses the existing index may be less costly to flash than the temporary hash table.

In one embodiment, the query optimizer may decide between execution plans based on a comparison between the sum of the cost to run the query plans and the cost to memory flash. That is, if $R_1$ and $R_2$ are the costs to run query plans 1 and 2, and $CMF_1$ and $CMF_2$ are the costs to memory flash for query plans 1 and 2, respectively, then the query optimizer may compare $R_1+CMF_1$ to $R_2+CMF_2$, and choose the lower cost value. For example, if $R_1=9$ and $R_2=10$, but $CMF_1=3$ seconds to flash large temporary object(s) (e.g., a hash table), whereas $CMF_2=1$ second to flash an existing object in memory, then the query optimizer may select query plan 2 for execution, even though query plan 2 is slower in strict runtime when flashing cost is not considered.

In another embodiment, the query optimizer may compute a percentage of an existing object that needs to be loaded into memory (e.g., from disk) versus the pages of the object that are already in memory and are unchanged, and therefore already flashed to the secondary VM. As discussed, the query optimizer may keep track of the percentages of objects in memory such as indexes, hash tables, buffer pools, sort buffers, temporary tables, materialized query tables (MQTs), etc. The query optimizer may further account for portions of the object that need to be loaded to memory for a particular query execution plan to determine the percentage of an existing object that needs to be loaded into memory versus the pages of the object already in memory and unchanged. The query optimizer may then adjust the cost of flashing the object to the secondary VM based on this computation. For example, if a execution plan will require using a hash table or an index object X, the query optimizer may first determine what percentage of object X is already in memory and is likely to remain unchanged based on, e.g., known velocity of changes to the table. The query optimizer may then determine how many memory pages will be affected by loading the rest of object X into memory. The query optimizer may adjust the cost to flash only those newly loaded memory pages for object X, plus any dirty memory pages if the object is changed. The query optimizer may then use the adjusted flashing cost of the object to determine if or how to use the object in the query plan. In another embodiment, the query optimizer may compare query plans at the time they are constructed, as opposed to when the plans are completed.

At step 360, the query optimizer selects the query having the fastest modified execution plan for execution. A query engine may then execute the query according to the selected query execution plan.

Figure 4:
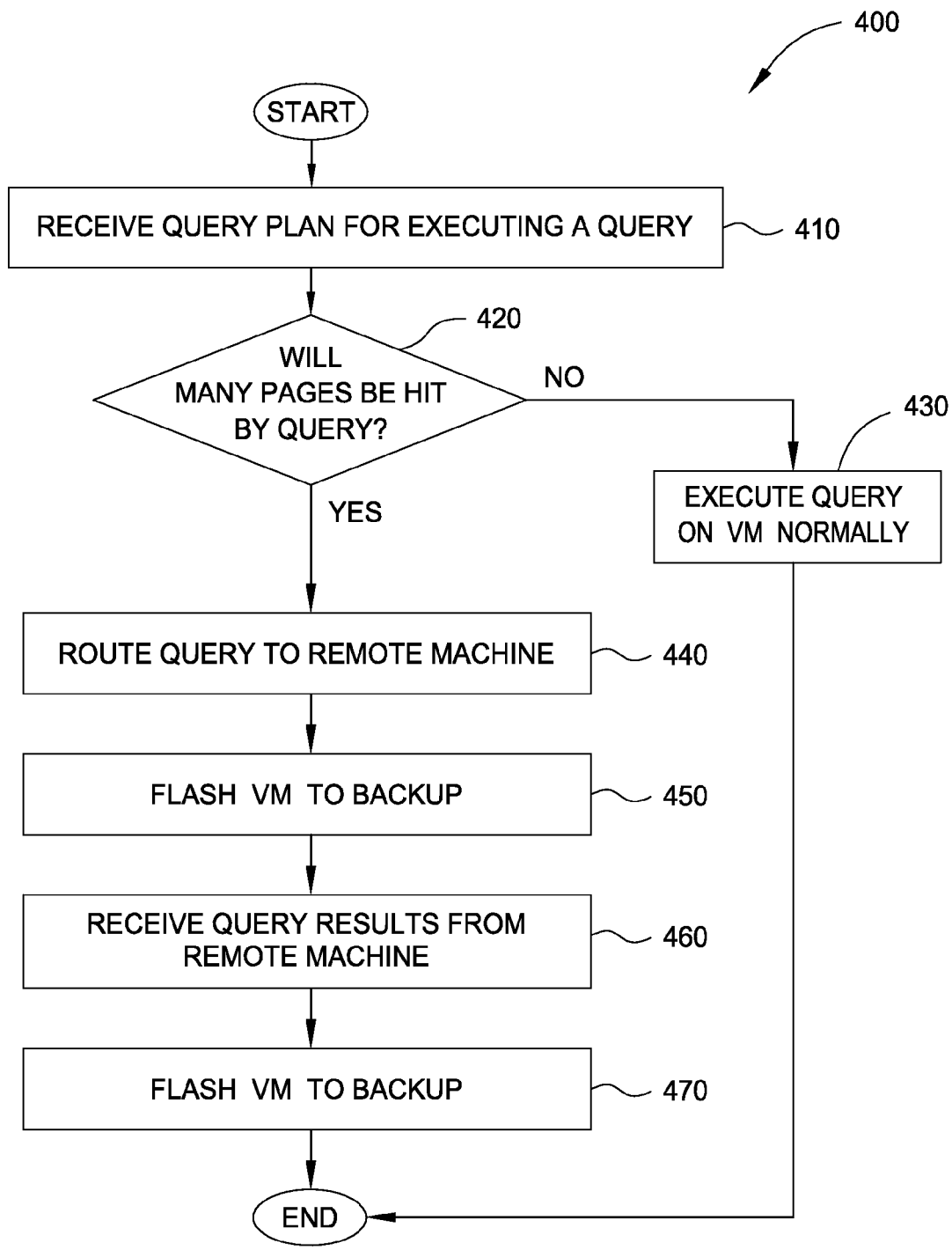
FIG. 4 illustrates a method for offloading query execution to a remote machine, according to one embodiment.

FIG. 4 illustrates a method 400 for offloading query execution to a remote machine, according to an embodiment. As shown, the method 400 begins at step 410, where a query optimizer receives a query plan for executing a given query. As discussed, techniques are known for generating query execution plans, and the query optimizer may itself generate the execution plan in some embodiments.

At step 420, the query optimizer determines if many memory pages will be hit by the query, when the received query plan is executed. Here, "many" may refer to, e.g., exceeding some predefined threshold value. Changes to many memory pages may result in an expensive flashing cost. In one embodiment, the query optimizer may determine, e.g., whether and what percentage of an object used in the query plan needs to be loaded into memory to execute the query plan. As discussed, the query optimizer may keep track of the percentage of objects resident in memory. In such a case, the query optimizer if many memory pages will be hit by based on whether and what percentage of an object used in the query plan is not already resident in, and needs to be loaded into, memory to execute the query plan.

If it is not the case that many pages will be hit by the query, then, at step 430, the query optimizer executes the query on the VM normally. If, however, many pages will be hit by the query, then, at step 440, the query optimizer routes the query to a remote VM. Doing so may avoid having to flash the memory pages to the secondary VM, as the query is executed on the remote VM, whose memory pages are modified instead of the original memory pages of the original VM being modified. In one embodiment, the call to the remote VM may be given the address of the secondary VM in case the primary VM fails while the query is running. In such a case, if the primary VM fails, then query results may be returned to the secondary VM.

Although discussed above with respect to executing the query on the VM or routing the query to a remote VM, the query optimizer may, in another embodiment, compare one or both of these approaches to each other and to other query plans to select a best query plan for execution. That is, the query optimizer may consider routing the query to the remote VM and executing the query on the original VM as query plans in selected a best query plan. Although discussed with respect to routing the query to a remote VM, in an alternative embodiment, the query may be routed to a remote physical computer system, as opposed to a VM.

At step 450, the VM is flashed to a secondary VM. Note, only the call to the remote VM is flashed, which may be relatively inexpensive compared to flashing temporary data generated while executing the query. The temporary data is not flashed, because such data is stored in memory of the remote machine executing the query.

At step 460, the query optimizer receives the query results from the remote machine. At step 470, the VM is flashed to the backup VM again. Here, the results may be flashed to the backup VM. However, the temporary data generated by the remote machine while executing the query, which is not returned, is not flashed. In one embodiment, the cost savings from avoiding this flashing may be weighed against the cost of transferring the query and results from the VM to the remote VM and back, respectively. For example, this may be used in comparing a query plan which includes routing of the query to the remote machine to other query plans.

Advantageously, embodiments disclosed herein permit a query optimizer to consider not only the strict cost of running a query plan on a traditional VM, but also the cost of flashing memory to a secondary VM. As a result, the query optimizer may select a faster query execution plan, given the flashing costs, even if the execution plan is slower on a traditional VM in which VM mirroring is not performed. Further, queries which will affect many memory pages and result in expensive flashing may be offloaded to a remote VM, and results returned to the original VM, thereby avoiding the expensive flashing.

While the foregoing is directed to embodiments of the present invention, other and further embodiments of the invention may be devised without departing from the basic scope thereof, and the scope thereof is determined by the claims that follow.

What is claimed is:

1. One or more non-transitory computer-readable storage media storing instructions, which when executed by one or more processors, performs operations for optimizing query execution, comprising:
- determining an original runtime for each of multiple execution plans for a query;
- if execution of the query overlaps with one or more virtual machine (VM) mirroring operations:
  - modifying each of the original runtimes of the execution plans based on time required to perform the mirroring operations if the query were executed according to the execution plan, wherein the time required to perform the mirroring operations is determined based on an estimated number of memory pages that would become dirty and a cost to flash the dirty memory pages,
  - selecting one of the execution plans based on the modified runtimes, and
  - executing the query according to the selected execution plan; and
- if execution of the query does not overlap with any VM mirroring operations:
  - executing the query according to the execution plan with the fastest original runtime.

2. The non-transitory computer-readable storage media of claim 1, wherein the time required to perform the mirroring operations is determined based on a computed percentage of an object to be loaded into memory and a computed percentage of the object that is already in the memory and unchanged, if the query were executed according to the execution plan.

3. The non-transitory computer-readable storage media of claim 2, the operations further comprising:
- if the computed percentage of the object to be loaded into the memory is greater than a threshold value, routing the query to be executed on a remote machine; and
- receiving results of the query from the remote machine after the query is executed.

4. The non-transitory computer-readable storage media of claim 2, the operations further comprising, tracking percentages of objects that are used in queries and stored in the memory.

5. The non-transitory computer-readable storage media of claim 4, wherein the objects include at least one of an index, a hash table, a buffer pool, a sort buffer, a temporary table, and a materialized query table (MQT).

6. The non-transitory computer-readable storage media of claim 2, the operations further comprising, determining if or how to use the object in at least one of the query execution plans based on the computed percentage of the object to be loaded into the memory and the computed percentage of the object that is already in the memory.

7. The non-transitory computer-readable storage media of claim 1, the operations further comprising, making an attempt to schedule the query to execute when VM mirroring operations do not occur.

8. A system, comprising:
- a computing device, having a processor and memory, configured to execute a program for optimizing query execution, by performing the steps of:
  - determining an original runtime for each of multiple execution plans for a query,
  - if execution of the query overlaps with one or more virtual machine (VM) mirroring operations:
    - modifying each of the original runtimes of the execution plans based on time required to perform the mirroring operations if the query were executed according to the execution plan, wherein the time required to perform the mirroring operations is determined based on an estimated number of memory pages that would become dirty and a cost to flash the dirty memory pages;
    - selecting one of the execution plans based on the modified runtimes; and
    - executing the query according to the selected execution plan, and
  - if execution of the query does not overlap with any VM mirroring operations:
    - executing the query according to the execution plan with the fastest original runtime.

* * * * *